United States Patent
Yang et al.

(10) Patent No.: US 10,348,228 B1
(45) Date of Patent: Jul. 9, 2019

(54) MOTOR DRIVING CIRCUIT AND METHOD THEREOF

(71) Applicant: ANPEC ELECTRONICS CORPORATION, Hsinchu (TW)

(72) Inventors: Chia-Tai Yang, Tainan (TW); Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/104,026

(22) Filed: Aug. 16, 2018

(30) Foreign Application Priority Data

May 14, 2018 (TW) .............................. 107116276 A

(51) Int. Cl.
*H02P 6/28* (2016.01)
*H02P 6/16* (2016.01)
*H02K 29/08* (2006.01)

(52) U.S. Cl.
CPC .................. *H02P 6/28* (2016.02); *H02P 6/16* (2013.01); *H02K 29/08* (2013.01)

(58) Field of Classification Search
CPC ....................................................... H02P 6/28
USPC ..................................................... 318/400.02
See application file for complete search history.

(56) References Cited

U.S. PATENT DOCUMENTS

2009/0102437 A1* 4/2009 Nakagawa ................ H02P 9/48
323/217
2018/0183368 A1* 6/2018 Murakami .............. H02P 6/182

* cited by examiner

*Primary Examiner* — Kawing Chan
(74) *Attorney, Agent, or Firm* — Li & Cai Intellectual Property (USA) Office

(57) ABSTRACT

A motor driving circuit includes a Hall sensor, a driving circuit, a phase adjuster, and a phase current zero point detector. The Hall sensor detects the rotor position of the motor and generates the Hall signal group. The driving circuit generates the initial phase changing signal according to the Hall signal group. The phase current zero point detector receives and detects the phase current zero point of the phase current signal group, and generates and outputs the phase current zero point signal. The phase adjuster determines a phase difference between the phase current zero point and the intermediate point between the first phase changing point and the second phase changing point, and adjusts the initial phase changing signal according to the phase difference to generate and output the adjusted phase changing signal to drive the motor.

10 Claims, 10 Drawing Sheets

MOTOR DRIVING CIRCUIT AND METHOD THEREOF

CROSS-REFERENCE TO RELATED PATENT APPLICATION

This application claims the benefit of priority to Taiwan Patent Application No. 107116276, filed on May 14, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving circuit and a motor driving method, and more particularly to a motor driving circuit and a motor driving method capable of automatically adjusting the phase current and the back EMF to be phase synchronized according to the phase current zero point so as to improve the efficiency.

BACKGROUND OF THE DISCLOSURE

The back electromotive force voltage of the stator armature of a brushless DC motor is proportional to the rotational speed of the rotor, but the rotor magnetic field thereof is fixed. Therefore, when the motor is operated to the maximum output of the rated speed, appropriate current phase control is required to obtain the maximum torque. However, since the brushless DC motor is an inductive load, as the speed increases, the phase current will fall behind the phase voltage, thus causing the torque output to deteriorate.

The phase angle of the output voltage of the existing motor needs to be manually adjusted, so that a three-phase DC brushless motor can maintain good use efficiency under different operating conditions. However, since the operating condition for the three-phase DC brushless motor changes significantly according to different applications thereof, the conventional method will cost a lot of manpower and is not effective.

Therefore, how the above-mentioned defects can be overcome by improvement of the circuit design, so that the motor driving circuit can automatically adjust the phase current and the back EMF to be phase synchronized, has become an important issue in the art.

SUMMARY OF THE DISCLOSURE

One object of the present disclosure is to provide a motor driving circuit, which is electrically connected to the motor and includes a Hall sensor, a driving circuit, a phase adjuster and a phase current zero point detector. The Hall sensor is configured to detect a rotor position of the motor and generate a Hall signal group, and the Hall signal group includes a first Hall signal and a second Hall signal having a first phase changing point and a second phase changing point, respectively. The driving circuit is configured to receive the Hall signal group, and to generate an initial phase changing signal according to the Hall signal group. The phase adjuster is coupled to the motor through an inverter circuit, and is configured to output the initial phase changing signal through the inverter circuit to control a phase change state of the motor, so as to cause the motor to operate according to the initial phase changing signal, wherein the inverter circuit generates a phase current signal group. The phase current zero point detector is configured to receive the phase current signal group, to detect a phase current zero point of the phase current signal group, and to generate and output a phase current zero point signal. The phase adjuster receives the phase current zero point signal, and determines a phase difference between an intermediate point and the phase current zero point, the intermediate point being between the first phase changing point and the second phase changing point, and the phase adjuster further adjusting the initial phase changing according to the phase difference to generate and output an adjusted phase changing signal to drive the motor.

Another object of the present disclosure is to provide a motor driving method for driving a motor, the method including: configuring a Hall sensor to detect a rotor position of the motor and generate a Hall signal group, wherein the Hall signal group includes a first Hall signal and a second Hall signal having a first phase changing point and a second phase changing point, respectively; configuring a driving circuit to receive the Hall signal group, and to generate an initial phase changing signal according to the Hall signal group; configuring a phase adjuster to output the initial phase changing signal through the inverter circuit to the motor to control a phase change state of the motor, so as to cause the motor to operate according to the initial phase changing signal, wherein the inverter circuit generates a phase current signal group; configuring a phase current zero point detector to receive the phase current signal group, to detect a phase current zero point of the phase current signal group, and to generate and output a phase current zero signal; configuring the phase adjuster to receive the phase current zero point signal, and determining a phase difference between an intermediate point and the phase current zero point, wherein the intermediate point is between the first phase changing point and the second phase changing point; and configuring the phase adjuster to adjust the initial phase changing according to the phase difference to generate and output an adjusted phase changing signal to drive the motor.

One of the advantages of the present disclosure is that the motor driving circuit provided by the present disclosure may determine a phase difference between the intermediate point between the first phase changing point and the second phase changing point and the phase current zero point through the technical features of "the phase adjuster" and "the phase current zero point detector", such that the phase current and the back EMF of the motor may be adjusted to be phase synchronized, thereby improving the efficiency of the three-phase DC brushless motor, and being capable of matching various types of operating conditions of three-phase DC brushless motors, so as to save manpower and time costs.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
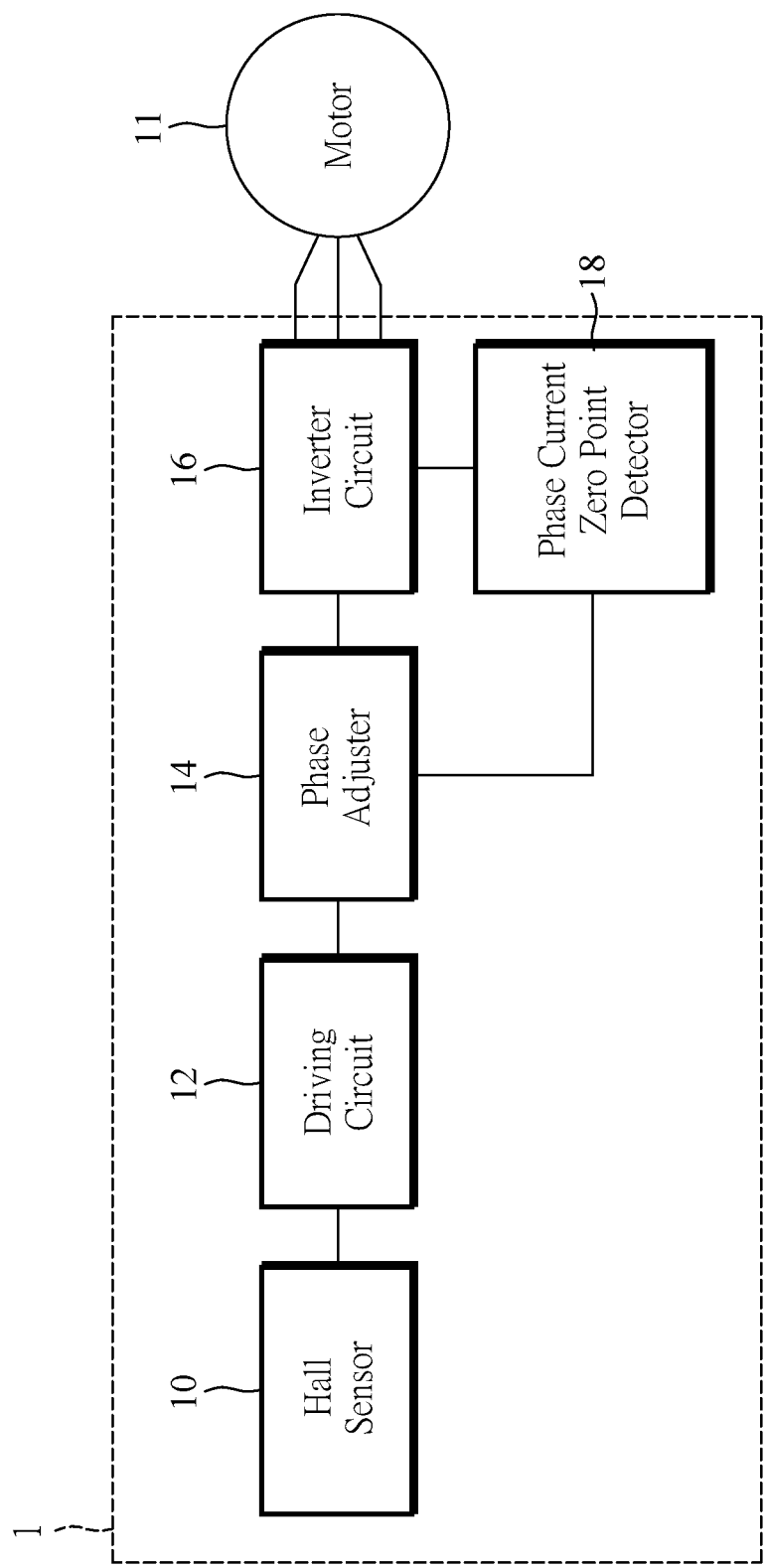
FIG. 1 is a schematic circuit diagram of a motor driving circuit of the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiments of the present disclosure relating to the "motor driving circuit and motor driving method" are described by way of specific embodiments, and those skilled in the art can understand the advantages and effects of the present disclosure from the disclosure of the present specification. The invention can be implemented or applied in various other specific embodiments, and various modifications and changes can be made without departing from the spirit and scope of the invention. In addition, the drawings of the present disclosure are merely illustrative and are not intended to be stated in the actual size. The following embodiments will further explain the related technical content of the present disclosure, but the disclosure is not intended to limit the scope of the present disclosure.

It should be understood that, although the terms "first", "second", "third", and the like may be used herein to describe various elements or signals, these elements or signals are not limited by these terms. These terms are primarily used to distinguish one element from another or one signal from another. In addition, the term "or" as used herein may include a combination of any one or more of the associated listed items, depending on the actual situation.

First Embodiment

Figure 2:
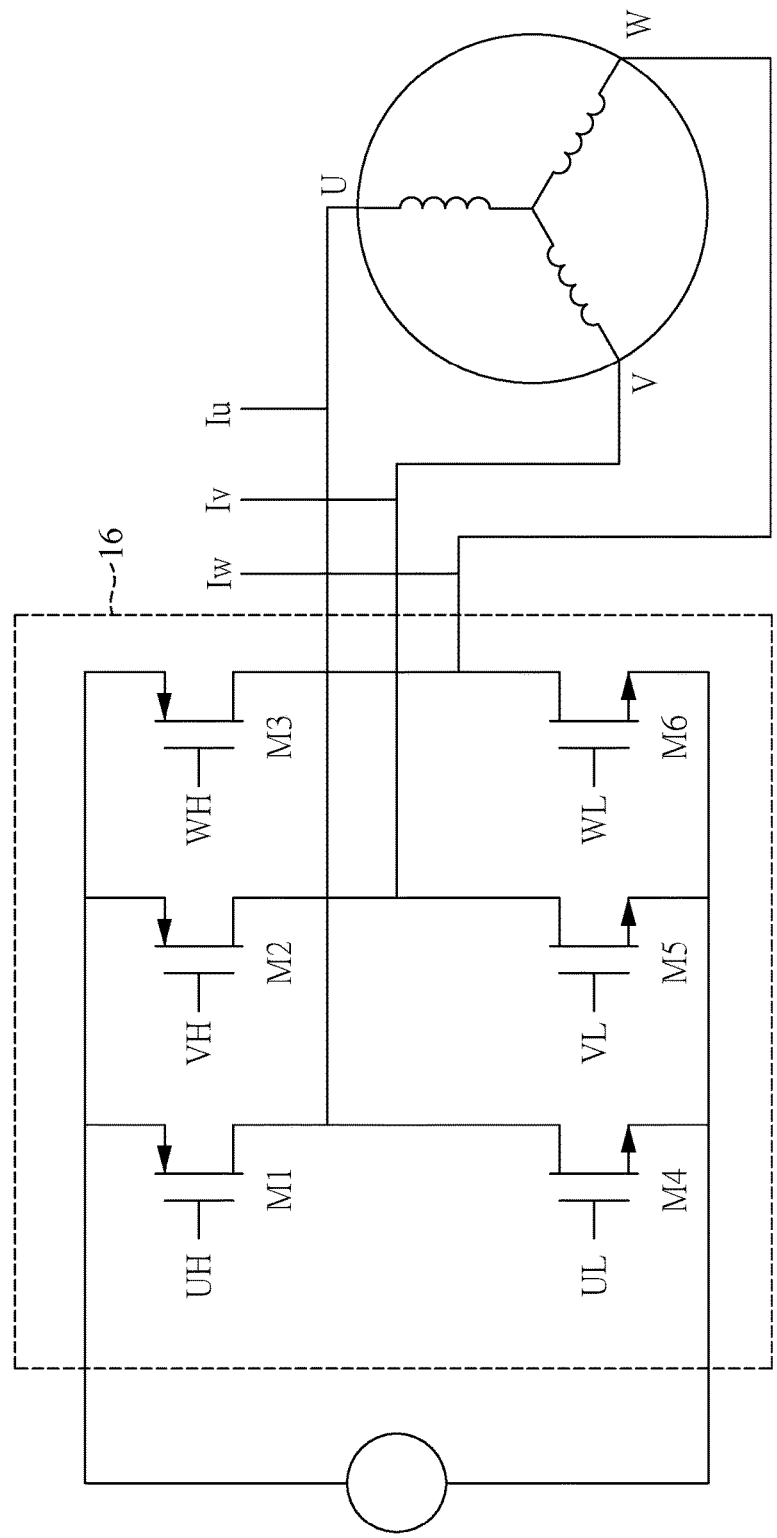
FIG. 2 is a schematic circuit diagram of the motor and the inverter circuit.
Figure 3:
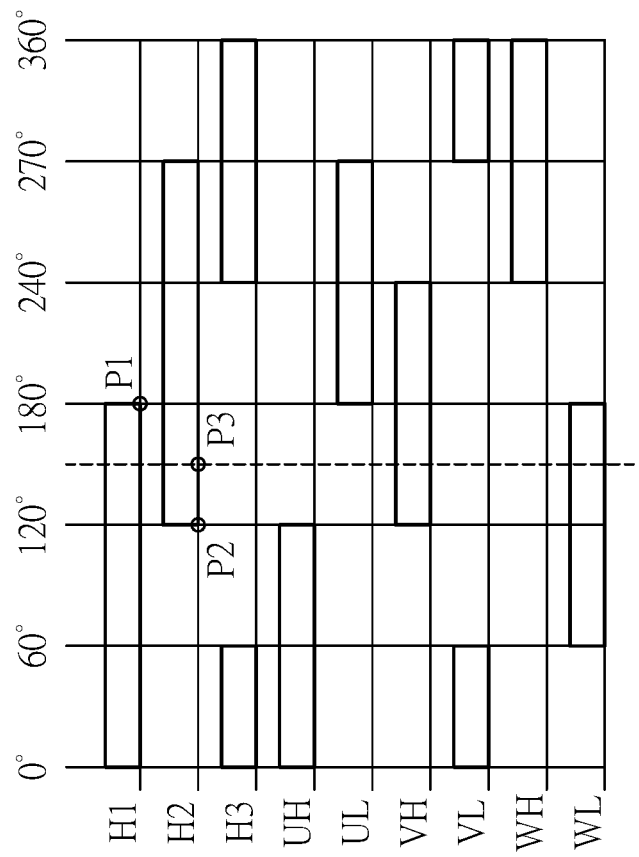
FIG. 3 is a schematic diagram showing six-step square waves being controlled and switched by the signal(s) of a Hall sensor.

Reference is now made to FIGS. 1 to 3, FIG. 1 is a circuit schematic diagram of a motor driving circuit of the first embodiment of the present disclosure, FIG. 2 is a circuit schematic diagram of the motor and the inverter circuit, and FIG. 3 is a switching signal schematic diagram of six-step square wave controlled by the Hall sensor. Reference is now made to FIG. 1, a first embodiment of the present disclosure provides a motor driving circuit 1 for driving a motor 11. The motor driving circuit 1 includes a Hall sensor 10, a driving circuit 12, a phase adjuster 14, an inverter circuit 16 and a phase current zero point detector 18.

The Hall sensor 10 may be disposed adjacent to the motor 11, and may be configured to sense changes in the magnetic field of the motor 11 and determine the rotor position of the motor 11, thereby generating a Hall signal group, such as a first Hall signal H1, a second Hall signal H2 and a third Hall signal H3 as shown in FIG. 3. Next, the driving circuit 12 receives the Hall signal group to respectively output the switching signals UH, UL, VH, VL, WH, WL to control the ON or OFF states of the respective switching units in the inverter circuit 18.

Next, reference is made to FIG. 2. In general, the motor 12 has three windings, which are a U coil winding U, a V coil winding V, and a W coil winding W. As can be seen from the circuit architecture of FIG. 2, the inverter circuit 16 includes transistors M1, M2, M3, M4, M5, and M6. When the transistor M1 and the transistor M5 are turned on, the current for operating the motor flows from the power supply terminal, through the transistor M1, the U coil winding U and the V coil winding V of the motor 12, and then flows to the ground terminal through the transistor M5.

Generally, the currents for controlling a normal motor flows from the U coil winding U to the V coil winding V, the U coil winding U to the W coil winding W, and then changes the direction of the currents to flowing from the V coil winding V to the W coil winding W, the V coil winding V to the U coil winding U, and then V coil winding V to the W coil winding W. Next, other phase changes continuously control the flow direction of the currents of the U coil winding U, the V coil winding V, and the W coil winding W, thereby controlling the rotation direction of the motor. The phase change of the motor described above is only one way of controlling the motor to phase change, and other phase changing methods of the motor will not be described herein for the sake of brevity.

With further reference to FIG. 3, the rotor position information is measured using, for example, a digital Hall sensor having a resolution of 60 degrees (electrical angle), thereby obtaining coarse rotor position information generated after the motor is rotated.

Figure 4:
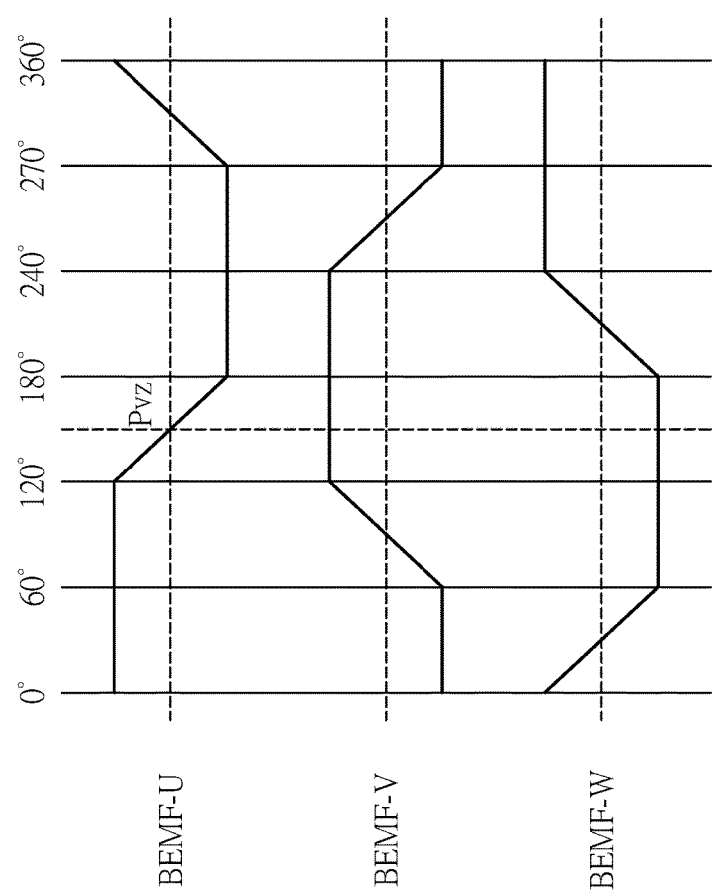
FIG. 4 is a schematic back EMF schematic diagram showing that the six step square waves in FIG. 3 are driven.

Taking the six-step square wave driving method as an example, the phase changing of the three-phase motor can be determined according to the phase changing point in the Hall signal group. If the first Hall signal H1 has a falling edge at 180 degrees, it can be regarded as the first phase changing point P1, and if the second Hall signal H2 has a rising edge at 120 degrees, it can be regarded as the second phase changing point P2. Here, an intermediate point P3 between the first phase changing point P1 and the second phase changing point P2 may be regarded as a reference point that may be referred to in FIG. 4, which is a back EMF schematic diagram driven with the six step square wave corresponding to FIG. 3. As depicted in FIG. 4, the phase change is ready to commence when a zero-crossing point (labeled as Pvz in FIG. 4, back EMF zero point) appears in the back EMF BEMF-U corresponding to the U-coil winding U while corresponding to the intermediate point P3, and proceeds to complete the electrical cycle of 0° to 360°. The driving circuit 12 generates an initial phase changing signal according to the Hall signal group.

Figure 5:
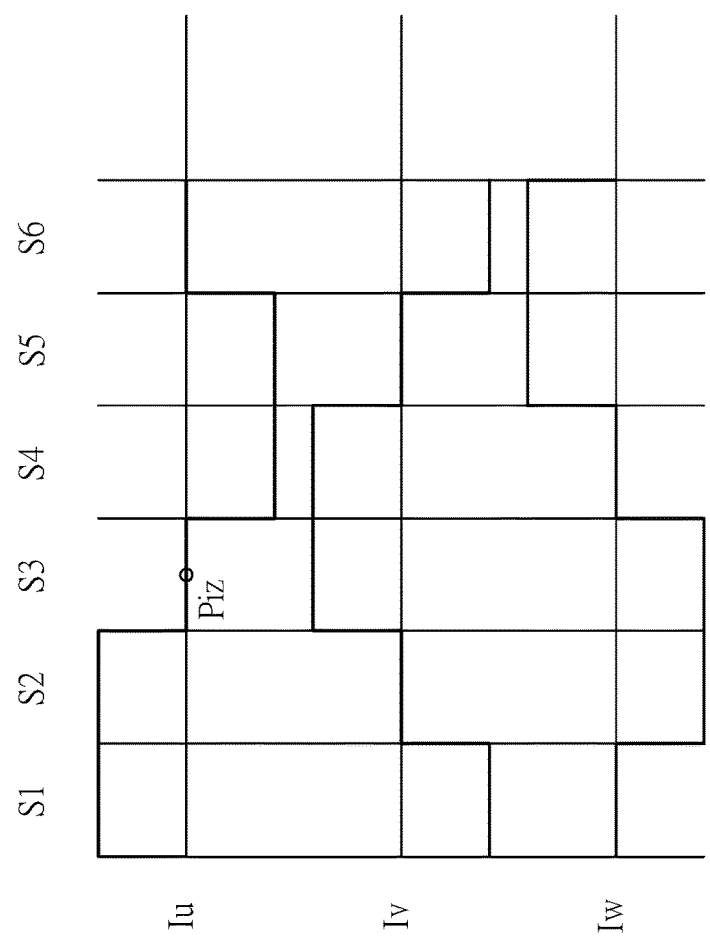
FIG. 5 is a diagram showing the relationship between the ideal phase currents driving with the six step square wave corresponding to FIG. 3.

In addition, if the output torque of the three-phase brushless DC motor is desired to be maintained at the maximum value, an appropriate current direction must be matched. Therefore, the corresponding ideal phase current relationship may be inferred as shown in FIG. 5, each of the phase currents Iu, Iv, Iw being 120 degrees apart. FIG. 5 is a diagram showing the relationship between the ideal phase currents driving with the six step square wave corresponding to FIG. 3. In FIG. 5, Steps S1 to S6 correspond to the six step square wave, with intervals of 60 degrees arranged from 0 to 360 degrees. It can be seen from FIG. 5 that in the process of changing the polarity of the back EMF, that is, in the region where the zero crossing point appears, the phase coil is in an unexcited state, which also corresponds to the phase current zero point Piz.

However, since the brushless DC motor is an inductive load, the phase current will fall behind the phase voltage as the speed increases, thus causing the torque output to be deteriorate. Therefore, it is necessary to adjust the initial phase changing signal, thereby adjusting the phase current and the back EMF to be phase synchronized.

Figure 6:
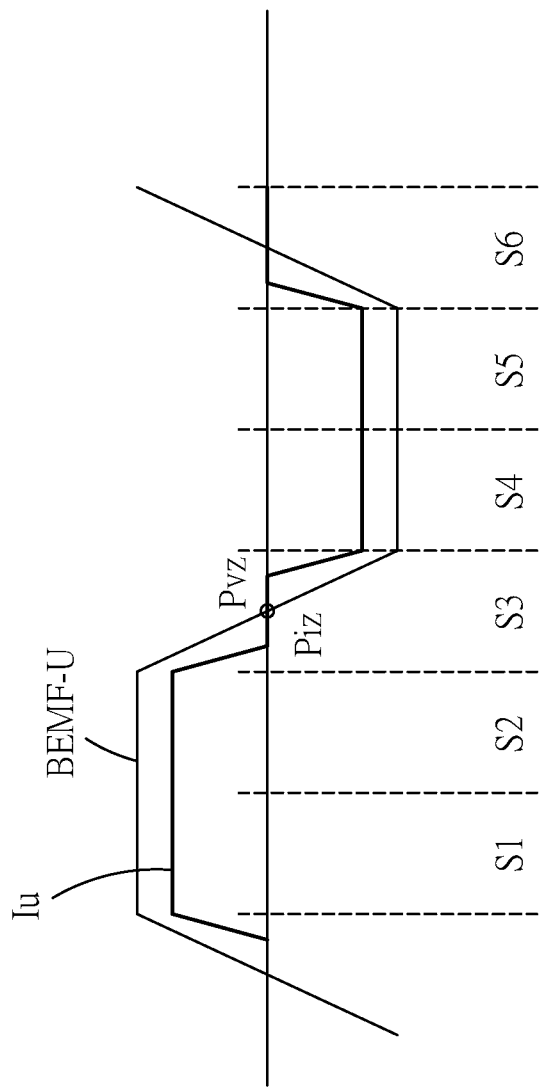
FIG. 6 is a schematic diagram of ideal back EMF and phase current.

Reference may additionally be made to FIG. 6, which is a schematic diagram of ideal back EMF and phase current. As shown in the figure, the phase current zero point Piz is located in the interval of step S3, and as long as the phase current zero point Piz is adjusted to be aligned with the electromotive force zero point Pvz, i.e., the phase current Iu and the back EMF BEMF-U are operated in the same phase, the motor 11 can be provided with better efficiency.

To this end, the motor driving circuit 1 of the present disclosure further includes the phase adjuster 14 and the phase current zero point detector 18. The phase adjuster 14 is coupled to the motor 11 through the inverter circuit 16, and outputs an initial phase changing signal through the inverter circuit 16 to control the phase change state of the motor 11, thereby causing the motor to operate according to the initial phase changing signal. In this case, the inverter circuit 16 generates a phase current signal group, including phase currents Iu, Iv, and Iw, and outputs the same to the phase current zero point detector 18. The phase current zero point detector 18 receives the phase current signal group, detects a phase current zero point of the phase current signal group, and generates and outputs a phase current zero signal. For example, the phase current zero point detector 18 may include a comparator for detecting whether the phase currents Iu, Iv, and Iw has a zero crossing point, and correspondingly generates a phase current zero signal.

Further, the phase adjuster 14 receives the phase current zero signal, and determines the phase difference between the phase current zero point Piz and the intermediate point P3 between the first phase changing point P1 and the second phase changing point P2, and adjusts the initial phase changing signal according to the phase difference, so as to generate and output the adjusted phase changing signal to drive the motor 12.

Therefore, by utilizing the above configuration, the phase current and the back EMF of the motor may be adjusted to be phase synchronized by determining the phase difference between the intermediate point between the first phase changing point and the second phase changing point and the phase current zero point, thereby improving the efficiency of the three-phase DC brushless motor.

This embodiment merely exemplarily describes the core concept of the present disclosure, which will be described in more detail in the following embodiments in accordance with the accompanying drawings.

Second Embodiment

Figure 7:
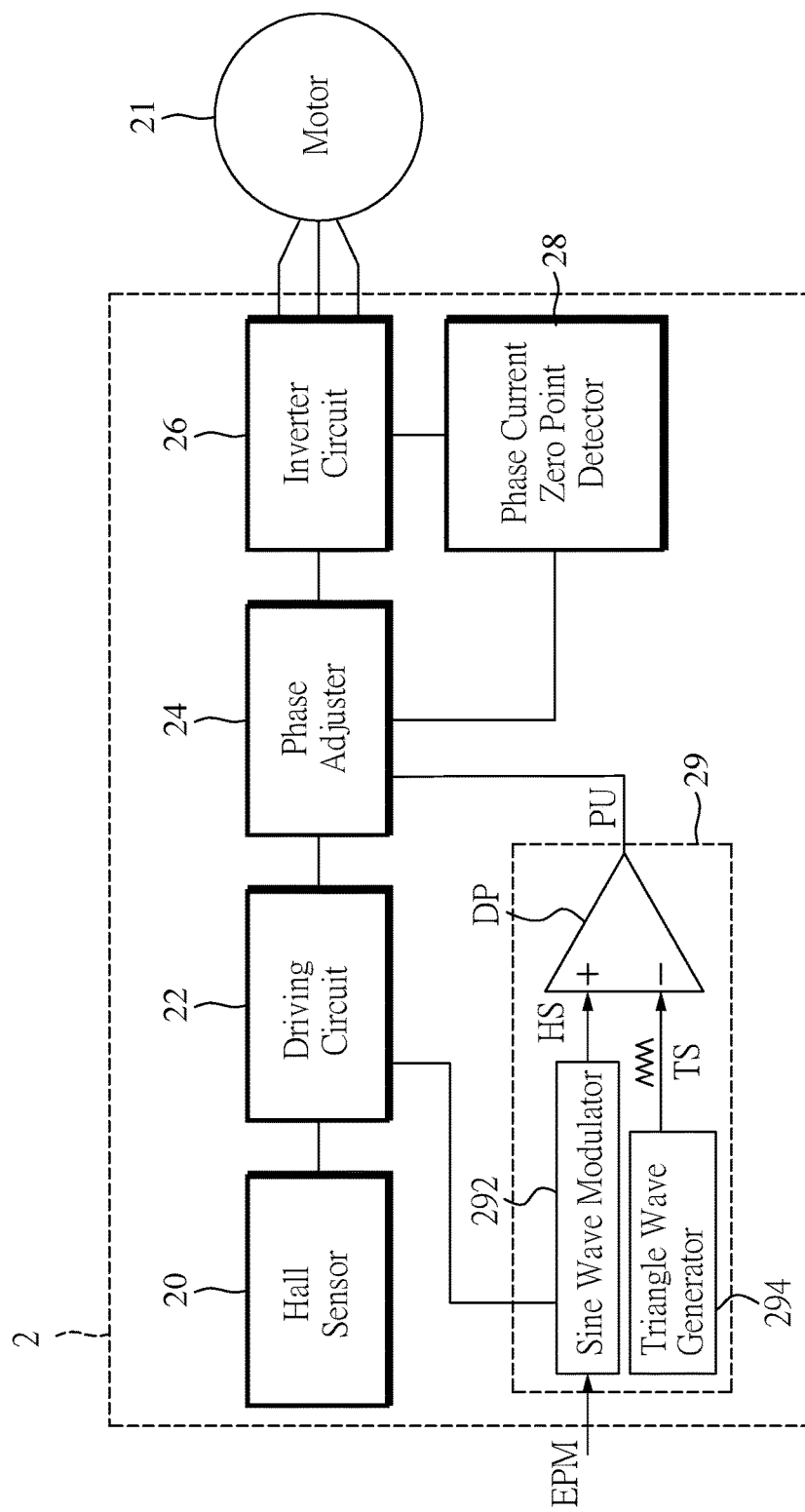
FIG. 7 is a circuit schematic diagram of a motor driving circuit of the second embodiment of the present disclosure.

Reference is now made to FIG. 7, which is a circuit schematic diagram of a motor driving circuit of the second embodiment of the present disclosure. The second embodiment of the present disclosure provides a motor driving circuit 2 for driving a motor 21, and the motor driving circuit 2 includes a Hall sensor 20, a driving circuit 22, a phase adjuster 24, an inverter circuit 26, a phase current zero point detector 28 and a PWM generator 29. In the present embodiment, like elements are denoted by like reference numerals, and the repeated description is omitted.

As shown, the motor driving circuit 2 further includes a PWM generator 29 coupled to the drive circuit 22, the PWM generator 29 is configured to generate a pulse modulation signal PU, and the drive circuit 22 receives the Hall signal group and the pulse modulation signal, and generates an initial phase changing signal and the adjusted phase changing signal according to the Hall signal group and the pulse modulation signal.

Specifically, in order to avoid a phenomenon in which the phase current of the motor 21 undergoes sudden and severe changes, the drive circuit 22 outputs the initial phase changing signal and the adjusted phase changing signal according to the pulse modulation signal PU. As shown in FIG. 7, the PWM generator 29 may include a sine wave modulator 292, a triangular wave generator 294, and a comparator DP. The comparator DP is electrically connected to the sine wave modulator 292 and the triangular wave generator 294.

The sine wave modulator 292 is configured to generate a sine wave modulation signal HS according to the initial phase changing signal. In another embodiment, the sine wave modulator 292 receives an externally transmitted amplitude modulation signal EPM and modulates the amplitude of the sinusoidal modulation signal HS accordingly. The triangular wave generator 294 is used to generate a triangular wave signal TS. It should be noted that, in this embodiment, the amplitude of the triangular wave signal TS is greater than or equal to the amplitude of the sine wave modulation signal HS.

The comparator DP is configured to receive the sine wave modulation signal HS and the triangular wave signal TS while performing a comparison calculation between the two (i.e., the sine wave modulation signal HS and the triangular wave signal TS). Further, in this embodiment, the positive input terminal of the comparator DP receives the sine wave modulation signal HS, the negative input terminal thereof receives the triangular wave signal TS, and the two are compared and calculated to generate the pulse width modulation signal PU. In this case, the frequency of the sine wave modulation signal HS is smaller than the frequency of the triangular wave signal TS.

Figure 8:
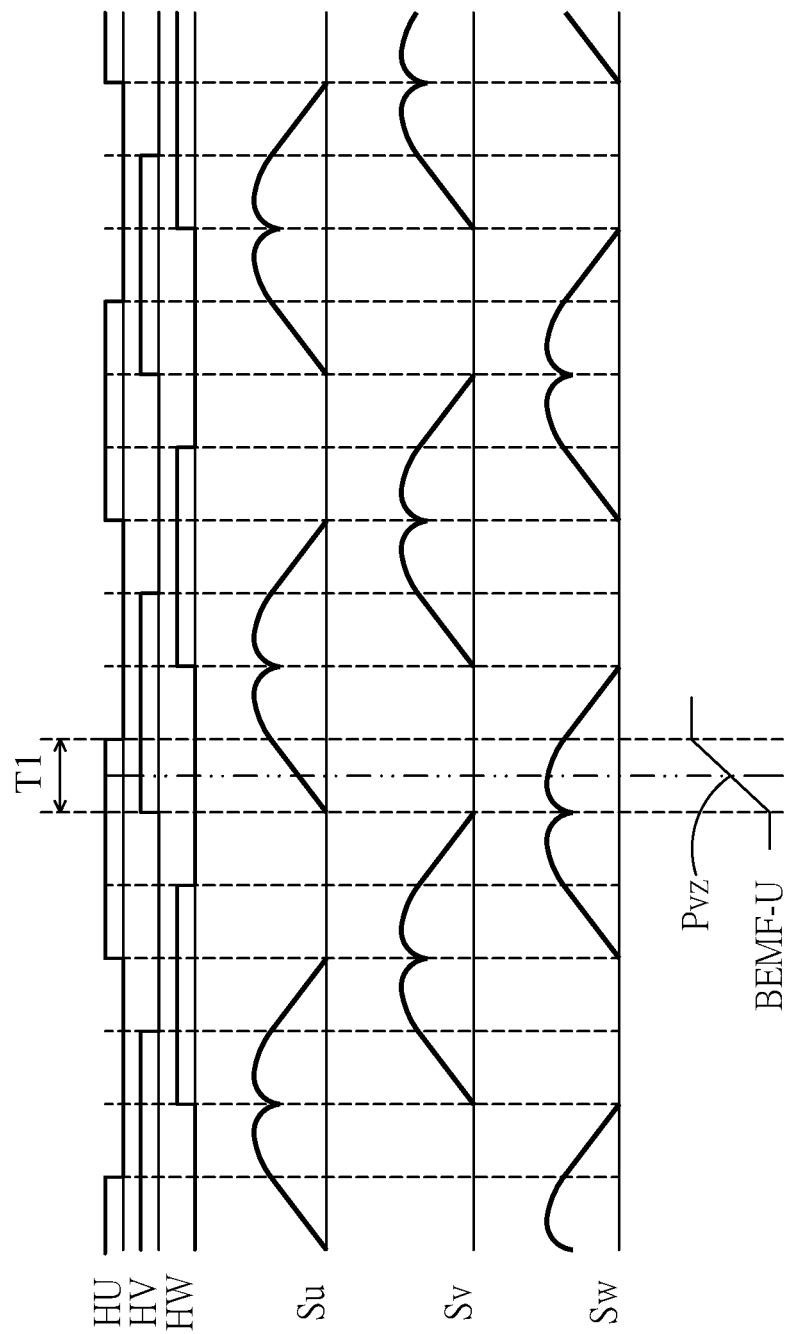
FIG. 8 is a schematic diagram of a Hall sensor signal corresponding to a sine wave modulation signal according to a second embodiment of the present disclosure.
Figure 9:
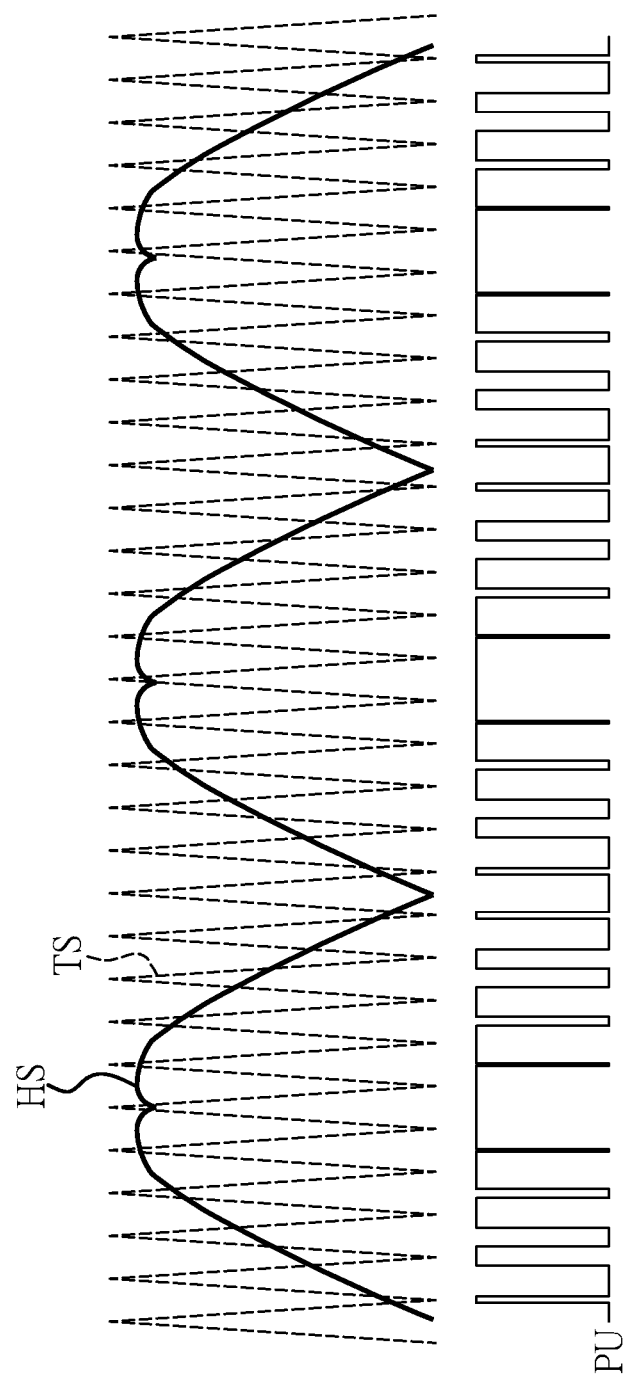
FIG. 9 is a waveform diagram showing a comparison operation between a sine wave modulation signal and a triangular wave signal according to an embodiment of the invention.

Reference is now made to FIGS. 8 and 9, FIG. 8 is a schematic diagram of a Hall sensor signal corresponding to a sine wave modulation signal according to a second embodiment of the present disclosure, and FIG. 9 is a waveform diagram showing a comparison operation between a sine wave modulation signal and a triangular wave signal according to an embodiment of the invention. As shown in FIG. 9, when the amplitude of the sine wave modulation signal HS is greater than or equal to the triangular wave signal TS, the comparator DP outputs a pulse width modulation signal PU with high voltage level. On the other hand, when the amplitude of the sine wave modulation signal HS is smaller than the triangular wave signal TS, the comparator DP outputs a pulse width modulation signal PU with low voltage level. Therefore, the duty ratio of the pulse width modulation signal PU will gradually increase from zero to a predetermined value, and then gradually decrease from the predetermined value to zero. For example, in one embodiment, the pulse width modulation signal PU is gradually increased from the duty cycle of 0% to the duty cycle of 100%, and then gradually reduced from the duty cycle of 100% to the duty cycle of 0%. In brief, the duty cycle of the pulse width modulation signal PU is determined by the intersection of the sine wave modulation signal HS and the triangular wave signal TS. Therefore, those skilled in the art can adaptively change the frequency of the triangular wave signal TS or the sine wave modulation signal HS, to cut out the pulse width modulation signal PU with different duty cycles, which can avoid the phenomenon where the current of the DC motor is changed rapidly. This embodiment does not limit the frequency of the triangular wave signal TS or the sine wave modulation signal HS.

Since the pulse modulation signal PU has a duty cycle from 0% to 100% or a duty cycle from 100% to 0% in a specific working interval, the phase current generated correspondingly will have a phase current zero point within this working interval.

For example, as shown in FIG. 8, the Hall signals HU, HV, and HW correspond to the first Hall signal H1, the second Hall signal H2, and the third Hall signal H3 in the foregoing embodiment, and the sine wave modulation signal HS may include three groups of modulation signals Su, Sv, and Sw corresponding to the phase currents Iu, Iv, and Iw, respectively. In the working interval T1, that is, between the first phase changing point and the second phase changing point, the intermediate point corresponds to a position where the zero-crossing point appeared in the back EMF BEMF-U corresponding to the U coil winding U, i.e., at the position where Pvz is labeled in FIG. 9, and the corresponding modulation signal Su will cause the PWM generator 29 to have a duty cycle from 0% to 100% in the working interval T1. Therefore, the phase current generated correspondingly will have a phase current zero point in this working interval T1.

Similarly, the inverter circuit 16 generates a phase current signal group, including phase currents Iu, Iv, and Iw, and outputs to the phase current zero point detector 18. The phase current zero point detector 18 is used for detecting whether the phase currents Iu, Iv, and Iw has a zero crossing point, and correspondingly generates a phase current zero signal.

Further, the phase adjuster 24 receives the phase current zero signal, determines the phase difference between the phase current zero point Piz and the back EMF zero point Pvz, and adjusts the initial phase changing signal according to the phase difference, so as to generate and output the adjusted phase changing signal to drive the motor 22. The phase current zero point Piz can be aligned with the back EMF zero point Pvz by outputting the adjusted phase changing signal.

The phase current and the back EMF of the motor may be adjusted to be phase synchronized by determining the phase difference between the back EMF zero point and the phase current zero point, thereby improving the efficiency of the three-phase DC brushless motor, and being capable of matching with various types of operating conditions of three-phase DC brushless motors, so as to save manpower and time costs.

Third Embodiment

Figure 10:
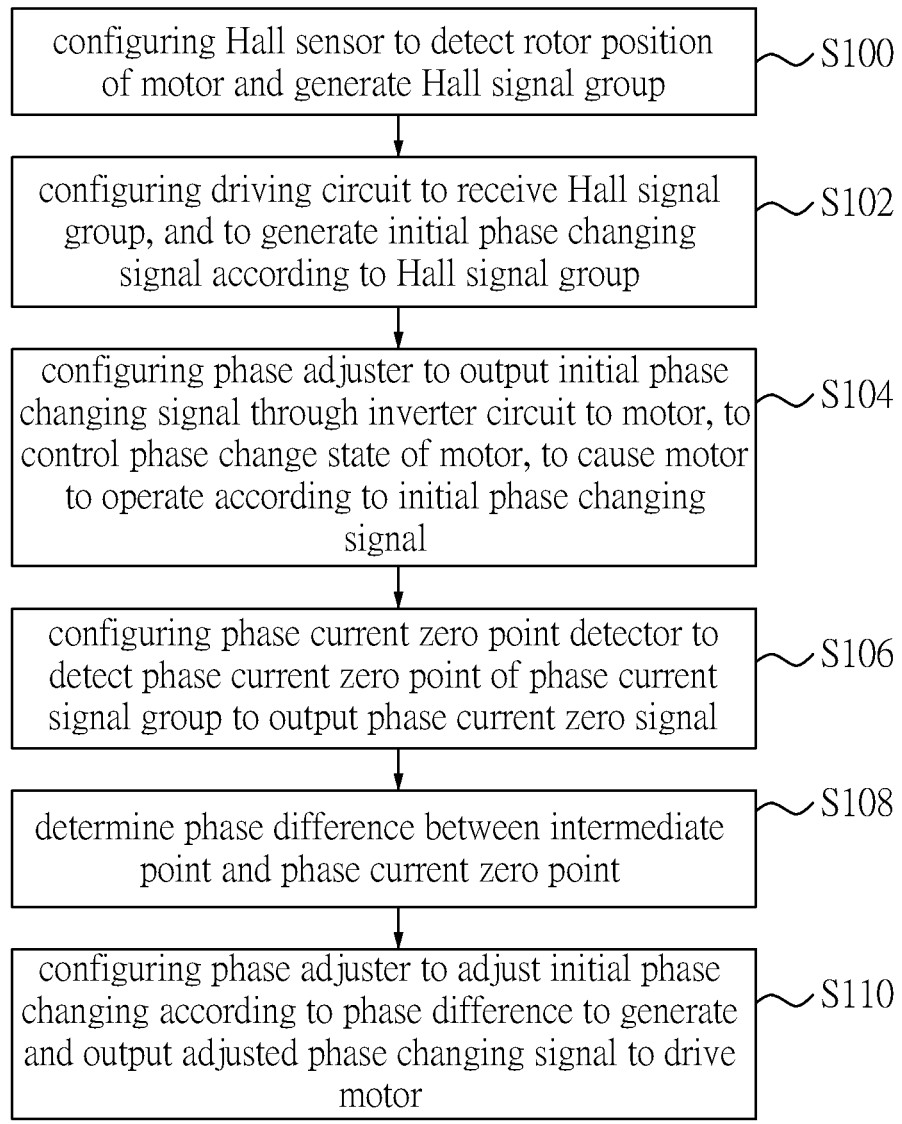
FIG. 10 is a flow chart showing a motor driving method according to a third embodiment of the present disclosure.

Reference is now made to FIG. 10, which is a flow chart showing a motor driving method according to a third embodiment of the present disclosure. The method according to the present embodiment may be performed in the motor driving circuit 1 or 2 shown in FIGS. 1 to 7, and thus reference is also made to FIGS. 1 to 6 in order to facilitate understanding, and the motor driving method includes:

Step S100: configuring a Hall sensor to detect a rotor position of the motor and generate a Hall signal group. Here, the Hall signal group includes a first Hall signal and a second Hall signal having a first phase changing point and a second phase changing point, respectively.

Preferably, the phase adjuster may further obtain a first back EMF zero point of a first back EMF according to the Hall signal group in this step, the first back EMF corresponds to the first Hall signal, and the first back EMF zero point is between the first phase changing point and the second phase changing point.

Step S102: configuring a driving circuit to receive the Hall signal group, and to generate an initial phase changing signal according to the Hall signal group.

Step S104: configuring a phase adjuster to output the initial phase changing signal through the inverter circuit to the motor to control a phase change state of the motor, so as to cause the motor to operate according to the initial phase changing signal. Here, the inverter circuit generates a phase current signal group.

Step S106, configuring a phase current zero point detector to receive the phase current signal group to detect a phase current zero point of the phase current signal group, and to generate and output a phase current zero signal.

Step S108: configuring the phase adjuster to receive the phase current zero point signal, and to determine a phase difference between an intermediate point and the phase current zero point. Specifically, the intermediate point is between the first phase changing point and the second phase changing point.

Preferably, the phase adjuster may further determine a phase difference between the phase current zero point and the first back EMF zero point in this step. The phase adjuster is configured to adjust the initial phase changing signal according to the phase difference to generate and output the adjusted phase changing signal, such that the first back EMF zero point is aligned with the phase current zero point to drive the motor.

Step S110: configuring the phase adjuster to adjust the initial phase changing according to the phase difference to generate and output an adjusted phase changing signal to drive the motor.

On the other hand, the motor driving method of the present disclosure may make reference to FIG. 7, in that a PWM pulse generator is further provided to generate a modulation signal. Next, the driving circuit is configured to receive the Hall signal group and the pulse modulation signal, and to generate a modulated initial phase changing signal according to the Hall signal group and the pulse modulation signal.

Details regarding the respective steps of the motor driving method have been described in the above-described embodiments of FIGS. 1 to 9, and will not be repeated herein. It should be noted that the steps of the embodiment of FIG. 10 are merely for convenience of description, and the sequence of the steps should not be taken as a limitation to the embodiments of the present disclosure.

Therefore, the phase current and the back EMF of the motor may be adjusted to be phase synchronized by determining the phase difference between the back EMF zero point and the phase current zero point through the above steps, thereby improving the efficiency of the three-phase DC brushless motor, and being capable of matching various types of operating conditions of three-phase DC brushless motors, so as to save manpower and time costs.

One of the advantages of the present disclosure is that the motor driving circuit provided by the present disclosure may determine a phase difference between the intermediate point between the first phase changing point and the second phase changing point and the phase current zero point through the technical features of "the phase adjuster" and "the phase current zero point detector", such that the phase current and the back EMF of the motor may be adjusted to be phase synchronized, thereby improving the efficiency of the three-phase DC brushless motor, and being capable of matching various types of operating conditions of three-phase DC brushless motors, so as to save manpower and time costs.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving circuit electrically connected to a motor, comprising:
   a Hall sensor configured to detect a rotor position of the motor and generate a Hall signal group, wherein the Hall signal group includes a first Hall signal and a second Hall signal having a first phase changing point and a second phase changing point, respectively;
   a driving circuit configured to receive the Hall signal group, and to generate an initial phase changing signal according to the Hall signal group;
   a phase adjuster coupled to the motor through an inverter circuit, and configured to output the initial phase changing signal through the inverter circuit to control a phase change state of the motor, so as to cause the motor to operate according to the initial phase changing signal, wherein the inverter circuit generates a phase current signal group;
   a phase current zero point detector configured to receive the phase current signal group to detect a phase current zero point of the phase current signal group, and to generate and output a phase current zero point signal, wherein the phase adjuster receives the phase current zero point signal and determines a phase difference between an intermediate point and the phase current zero point, the intermediate point is between the first phase changing point and the second phase changing point, and the phase adjuster further adjusts the initial phase changing according to the phase difference to generate and output an adjusted phase changing signal to drive the motor.

2. The motor driving circuit according to claim 1, wherein the phase adjuster further obtains a first back electromotive force (EMF) zero point of a first back EMF according to the Hall signal group, wherein the first back EMF corresponds to the first Hall signal, and the first back EMF zero point is between the first phase changing point and the second phase changing point.

3. The motor driving circuit according to claim 2, wherein the phase adjuster further determines a phase difference between the phase current zero point and the first back EMF zero point, and adjusts the initial phase changing signal according to the phase difference to generate and output the adjusted phase changing signal, such that the first back EMF zero point is aligned with the phase current zero point to drive the motor.

4. The motor driving circuit according to claim 1, further including a PWM generator connected to the driving circuit, wherein the PWM generator generates a pulse modulation signal according to the initial phase changing signal, the driving circuit receives the Hall signal group and the pulse modulation signal, and generates a modulated initial phase changing signal according to the Hall signal group and the pulse modulation signal.

5. The motor driving circuit according to claim 4, wherein the pulse modulation signal has a duty cycle from 0% to 100% or a duty cycle from 100% to 0% in a working interval, and after the motor is operated according to the initial phase changing signal, the phase current zero point is within the working interval.

6. A motor driving method for driving a motor, comprising:
   configuring a Hall sensor to detect a rotor position of the motor and generate a Hall signal group, wherein the Hall signal group includes a first Hall signal and a second Hall signal having a first phase changing point and a second phase changing point, respectively;
   configuring a driving circuit to receive the Hall signal group, and to generate an initial phase changing signal according to the Hall signal group;
   configuring a phase adjuster to output the initial phase changing signal through the inverter circuit to the motor to control a phase change state of the motor, so as to cause the motor to operate according to the initial phase changing signal, wherein the inverter circuit generates a phase current signal group;
   configuring a phase current zero point detector to receive the phase current signal group, to detect a phase current zero point of the phase current signal group, and to generate and output a phase current zero signal;

configuring the phase adjuster to receive the phase current zero point signal, and to determine a phase difference between an intermediate point and the phase current zero point, wherein the intermediate point is between the first phase changing point and the second phase changing point; and configuring the phase adjuster to adjust the initial phase changing according to the phase difference to generate and output an adjusted phase changing signal to drive the motor.

7. The motor driving method according to claim 6, further comprising:

configuring the phase adjuster to obtain a first back EMF zero point of a first back EMF according to the Hall signal group, wherein the first back EMF corresponds to the first Hall signal, and the first back EMF zero point is between the first phase changing point and the second phase changing point.

8. The motor driving method according to claim 7, further including:

configuring the phase adjuster to determine a phase difference between the phase current zero point and the first back EMF zero point; and configuring the phase adjuster to adjust the initial phase changing signal according to the phase difference to generate and output the adjusted phase changing signal, such that the first back EMF zero point is aligned with the phase current zero point to drive the motor.

9. The motor driving method according to claim 6, further comprising:

configuring the PWM generator to generate a pulse modulation signal; and configuring the driving circuit to receive the Hall signal group and the pulse modulation signal, and to generate a modulated initial phase changing signal according to the Hall signal group and the pulse modulation signal.

10. The motor driving method according to claim 9, wherein the pulse modulation signal has a duty cycle from 0% to 100% or a duty cycle from 100% to 0% in a working interval, and after the motor is operated according to the initial phase changing signal, the phase current zero point is within the working interval.

* * * * *